(12) United States Patent
Chmielewski

(10) Patent No.: US 9,722,514 B2
(45) Date of Patent: Aug. 1, 2017

(54) MOTOR DRIVE AND METHOD OF CONTROLLING A TEMPERATURE OF A MOTOR DRIVE

(71) Applicant: Control Techniques Limited, Newtown (GB)

(72) Inventor: James Frank Chmielewski, Prior Lake, MS (US)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 362 days.

(21) Appl. No.: 14/246,754

(22) Filed: Apr. 7, 2014

(65) Prior Publication Data

US 2015/0288303 A1    Oct. 8, 2015

(51) Int. Cl.
| | |
|---|---|
| G05D 23/00 | (2006.01) |
| H02P 3/06 | (2006.01) |
| H02M 1/32 | (2007.01) |
| H02P 3/12 | (2006.01) |
| H02K 9/22 | (2006.01) |
| B60L 1/00 | (2006.01) |

(Continued)

(52) U.S. Cl.
CPC ............ *H02P 3/06* (2013.01); *B60L 1/003* (2013.01); *B60L 1/08* (2013.01); *B60L 3/0061* (2013.01); *B60L 7/06* (2013.01); *B60L 11/1803* (2013.01); *B60L 15/2009* (2013.01); *H02K 9/22* (2013.01); *H02M 1/32* (2013.01); *H02P 3/12* (2013.01); *H02P 3/22* (2013.01); *H02P 29/68* (2016.02); *B60L 2210/30* (2013.01); *B60L 2240/36* (2013.01); *B60L 2240/425* (2013.01); *B60L 2240/662* (2013.01); *Y02T 10/645* (2013.01); *Y02T 10/7005* (2013.01); *Y02T 10/7241* (2013.01); *Y02T 10/7275* (2013.01); *Y02T 10/7291* (2013.01); *Y02T 90/16* (2013.01)

(58) Field of Classification Search
USPC ............................ 318/641, 788, 792, 366
See application file for complete search history.

(56) References Cited

U.S. PATENT DOCUMENTS 3,629,627 A * 12/1971 Dafler .................... H02K 9/19
                                                    310/44
3,794,898 A    2/1974 Gross
(Continued)

FOREIGN PATENT DOCUMENTS

| EP | 1225080 | 7/2002 |
| EP | 1750484 | 2/2007 |

(Continued)

*Primary Examiner* — Jorge L Carrasquillo
(74) *Attorney, Agent, or Firm* — Harness, Dickey & Pierce, P.L.C.

(57) ABSTRACT

There is provided a motor drive comprising: a temperature sensor arranged to sense a temperature of the drive; a braking resistor; switching means arranged when activated to cause current to flow to the braking resistor; and controlling means arranged to activate the switching means when the sensed temperature falls below a predetermined threshold. There is also provided a method of controlling a temperature of a motor drive comprising a braking resistor. The method comprising comprises: monitoring a temperature of the drive; and activating switching means to cause current to flow to the braking resistor when the monitored temperature falls below a predetermined threshold.

13 Claims, 2 Drawing Sheets

(51) Int. Cl.
*B60L 1/08* (2006.01)
*B60L 3/00* (2006.01)
*B60L 7/06* (2006.01)
*B60L 11/18* (2006.01)
*B60L 15/20* (2006.01)
*H02P 3/22* (2006.01)
*H02P 29/68* (2016.01)

(56) References Cited

U.S. PATENT DOCUMENTS

| | | | |
|---|---|---|---|
| 5,523,640 | A | 6/1996 | Sparer et al. |
| 5,623,191 | A | 4/1997 | Wieloch |
| 5,774,353 | A | 6/1998 | Wieloch |
| 7,312,593 | B1 * | 12/2007 | Streicher ................ H02P 29/62 318/380 |
| 7,902,957 | B2 | 3/2011 | Lukaszewski et al. |
| 2003/0057916 | A1 | 3/2003 | Davis et al. |
| 2006/0254666 | A1 * | 11/2006 | Kusakari ............... E04G 21/122 140/57 |
| 2009/0183385 | A1 * | 7/2009 | Lee ......................... D06F 58/28 34/497 |
| 2011/0129323 | A1 | 6/2011 | Ehrat |
| 2013/0082045 | A1 | 4/2013 | Mazumdar |

FOREIGN PATENT DOCUMENTS

| | | |
|---|---|---|
| EP | 2164099 | 3/2010 |
| GB | 2459883 | 11/2009 |
| JP | 2007-071501 | 3/2007 |
| JP | 2013-119798 | 6/2013 |
| JP | 2013-164901 | 8/2013 |
| KR | 10-0836355 | 6/2008 |
| WO | 03/024176 | 3/2003 |
| WO | 2007/064381 | 6/2007 |
| WO | 2014/037607 | 3/2014 |

* cited by examiner

MOTOR DRIVE AND METHOD OF CONTROLLING A TEMPERATURE OF A MOTOR DRIVE

FIELD OF THE INVENTION

The present invention relates to a drive as used in motors. The invention also relates to a method of controlling a temperature of a motor drive, and in particular to a method of increasing a temperature of the drive to avoid malfunctioning of the drive.

BACKGROUND TO THE INVENTION

In applications such as rooftop air conditioning and refrigeration, drives used on the condenser fans can be exposed to temperatures as low as −40° C. As the drives are usually operated every day of the year, such cold environments can present problems to the smooth operation of the drives which generally cannot operate with the ambient temperature this low.

In order to allow drives to operate in low temperatures, one option is to replace a number of components of the drive, for example those components that are most susceptible to malfunctioning in low temperatures. Another solution is to place the drive in an enclosure and provide a separate power supply for a thermostatically controlled strip heater to maintain the drive within a typical 0-50° C. range, or any other temperature range the drive may ideally operate in. For example, the drive could be installed in a cabinet along with cabinet heaters, or else a special drive designed to cope with low ambient temperatures may be used. Such solutions, however, come with additional expense, and add to the overall cost and size of the drive, and introduce more components that can fail.

It is desirable, therefore, to provide a drive that may operate in low temperatures without the need to resort to additional components or without the need to house the drive in a separate enclosure. The present invention seeks to provide such a drive, as well as a method of operating a drive that may address these and other problems encountered in the art.

SUMMARY OF THE INVENTION

According to a first aspect of the invention, there is provided a motor drive comprising a temperature sensor arranged to sense a temperature of the drive. The motor drive further comprises a braking resistor and switching means arranged when activated to cause current to flow to the braking resistor. The motor drive further comprises controlling means arranged to activate the switching means when the sensed temperature falls below a predetermined threshold.

In typical drives, braking resistors are 'activated' or energised when the bus voltage in the drive is too high. To activate the braking resistor, switching means such as a braking transistor are activated which cause current to flow to the braking resistor to provide braking (the voltage is dissipated in the braking resistor). Thus, in the conventional use of a braking resistor, the DC bus voltage is monitored and, as the motor is decelerated more quickly than it would if coasting to a stop, the DC bus voltage rises, the braking transistor turns on and current flows to the braking resistor. This braking is energy dissipated as heat in the braking resistor. A braking resistor may therefore be a component arranged to dissipate heat generated during braking or deceleration of the motor.

The invention makes use of the braking resistor generally already present in a drive. In addition, rather than monitoring bus voltage to determine when to activate the switching means, the invention also leverages the fact that a temperature of the drive (such as a temperature of the drive's heat sink) is usually already monitored. The braking transistor may therefore be activated when the heat sink temperature drops below a predetermined threshold.

Thus, by energising the braking resistor when the drive identifies it is falling below a critical threshold temperature (for example 0° C.), the braking resistor may be used to dump excess energy from the motor to be dissipated as heat, enabling the drive to remain in a healthy operating temperature range.

Advantageously, the hardware needed for heating the drive or for providing braking is the same. The invention may be easily implemented in existing drives by adjusting the parameter (e.g. in software) that determines when the switching means is activated so as to heat the braking resistor. In particular, an existing temperature sensor of the drive, used to sense or monitor a temperature of a component of the drive, may cause the switching means to activate when the sensed temperature drops below a critical point.

Thus, the drive's own existing thermal management system may be used to determine when to energise the braking resistor. Motor drives generally include a thermal management function that may operate cooling fans to cool components of the drive should a temperature of a component increase too much. This internal measurement of temperature is used to shut the drive down if the temperature limits are exceeded. By using the temperature that is already measured to protect the drive's components from excessive heat which can cause over-temperature trips, the invention may provide additional temperature control by turning on the braking transistor to create heat in the braking resistor when too low a temperature is sensed.

The invention therefore provides an improved cost-efficient drive with a built-in thermal management function that may provide temperature control should the temperature of the drive drop too low. The drive may therefore operate in cold environments without the need for it to be housed in an enclosure, or for the drive to be retrofitted with more temperature-resistant components. The invention may be implemented using only software changes in the drive and using the existing drive thermal management system to create heat when required, and as a result the drive may control both cooling and heating of its components, rather than relying on an external controller.

Preferably, the temperature sensor may be arranged to sense a temperature of a component of the drive. The temperature sensor may monitor or otherwise sense the temperature(s) of more than one component of the drive, and in particular may sense the temperature of the component of the drive that is most sensitive to low temperatures. For example, the temperature sensor may sense the temperature of one or more components on the control board of the drive. The components may be any one of the braking transistor, a DC bus, an inverter, a power stage, a rectifier, and a control stage. A control stage generally includes two thermistors on the control board, and the temperature sensor may be arranged to sense a temperature of either one or both of the thermistors. If the temperature of either thermistor were detected to fall below the predetermined threshold, then the braking transistor may be turned on to generate heat in the braking resistor.

The component may be a heat sink. The heat sink may act as a passive heat exchanger to cool the drive by dissipating heat into the surrounding medium. The braking resistor may be embedded in the heat sink.

The controlling means may be further arranged to activate cooling means to cool the drive when the sensed temperature rises above a predetermined threshold. Thus, the same temperature sensor that monitors a component's temperature may be used in combination with the controlling means to energise the braking resistor if the temperature drops too low, and to activate cooling means (such as a fan) if the temperature rises too high. The controlling means may be further arranged to deactivate the cooling means arranged to cool the drive when the sensed temperature falls below the predetermined threshold. In some embodiments, the braking transistor leads may be routed together with the external cooling fan (e.g. cooling means) wires.

In a second aspect of the invention, there is provided a method of controlling a temperature of a drive comprising a braking resistor. The method comprises monitoring a temperature of the drive. The method further comprises activating switching means to cause current to flow to the braking resistor when the monitored temperature falls below a predetermined threshold.

BRIEF DESCRIPTION OF THE DRAWINGS

A preferred embodiment of the invention will now be described in conjunction with the accompanying drawings, of which.

DETAILED DESCRIPTION OF A PREFERRED EMBODIMENT

The present invention seeks to provide an improved motor drive. Whilst various embodiments of the invention are described below, the invention is not limited to these embodiments, and variations of these embodiments may well fall within the scope of the invention which is to be limited only by the appended claims.

Figure 1:
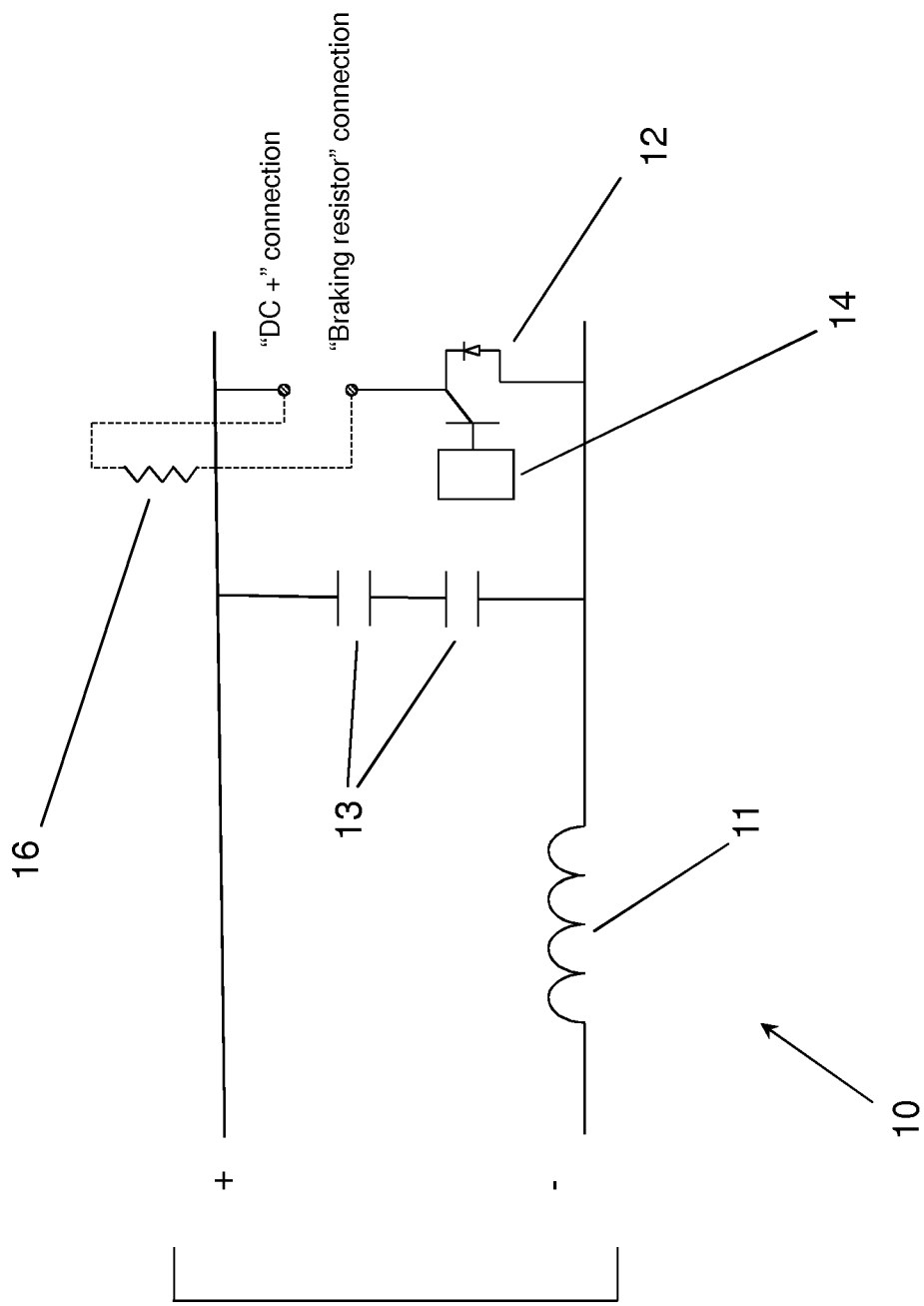
FIG. 1 is a circuit diagram in accordance with an embodiment of the invention.
Figure 2:
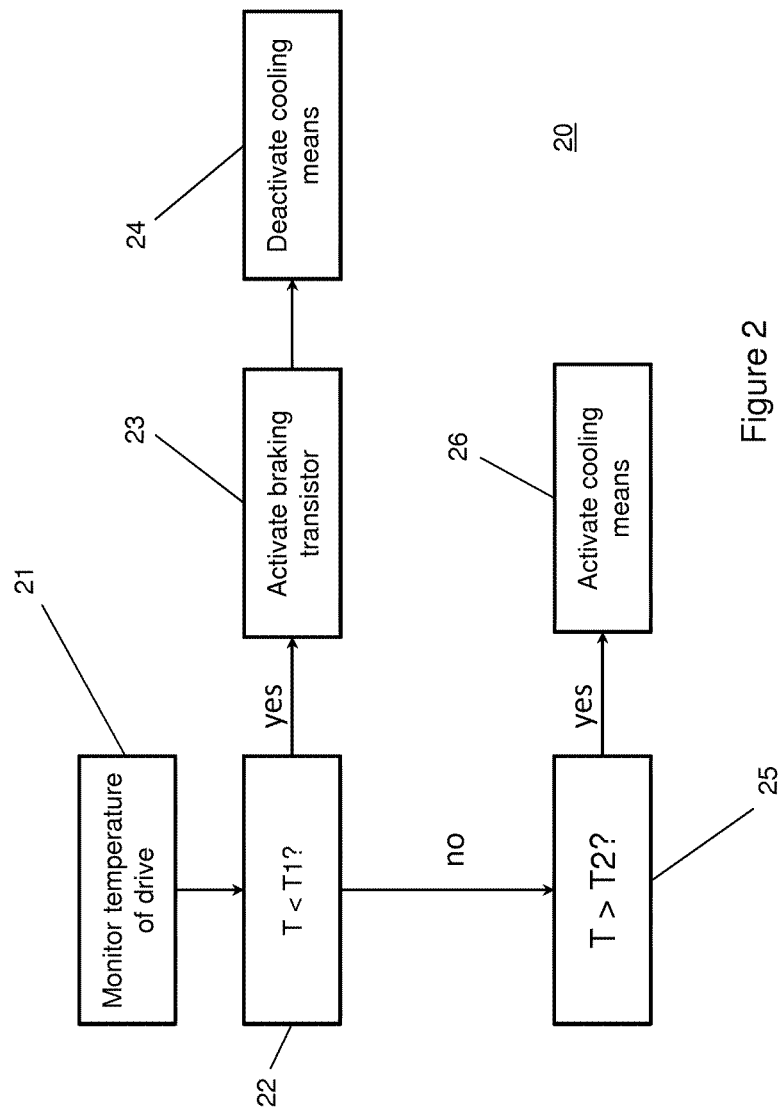
FIG. 2 is a flow chart illustrating steps taken by a method according to an embodiment of the invention.

FIG. 1 illustrates a circuit 10 arranged to control the temperature of a drive, in accordance with a preferred embodiment of the invention. Circuit 10 comprises switching means in the form of braking transistor 12. Braking transistor 12 is arranged in parallel to capacitors 13 and inductor 11.

Braking transistor 12 is coupled to drive temperature sensor 14. Braking transistor 12 is arranged when activated to alternately open and close a connection to braking resistor 16 embedded in a heat sink (not shown) of drive.

Drive temperature sensor 14 is arranged to sense or monitor a temperature of a component of drive. For example, drive temperature sensor 14 may be arranged to monitor a temperature of the component of the drive that is most sensitive to low temperatures. Such components may include one or more components on a control board (not shown) of the drive, such as braking transistor 12, a DC bus, an inverter, a power stage, a rectifier, and a control stage. In the preferred embodiment, drive temperature sensor 14 forms part of the internal temperature management of the drive. For example, drive temperature sensor 14 is an in-built temperature sensor arranged to monitor a temperature of a component of drive to ensure the temperature of the component does not reach a critically low or high point.

In the illustrated embodiment, drive temperature sensor 14 includes processing circuitry arranged to control the operation of braking transistor 12. In particular, controlling circuitry is arranged to activate braking transistor 12 so as to alternately open a close a circuit to braking resistor 16. In other embodiments, controlling circuitry may not be included in drive temperature sensor 14, but instead could communicate with drive temperature sensor 14, for example by receiving temperature data from drive temperature sensor 14. Controlling circuitry may then operate braking transistor 12 to divert current to braking resistor 16 as a function of the temperature data.

A method of operation 20 of circuit 10 will now be described, in accordance with a preferred embodiment of the invention. Braking transistor 12 is initially in an OFF state, such that current does not flow to braking resistor 16. At step 21, drive temperature sensor 14 monitors a temperature of a component of the drive. The component is generally a component which is most susceptible to low temperatures, although the drive temperature sensor may monitor the temperature of other components of the drive, or else of a group of components.

If at step 22 a temperature of the component is determined to fall below a predetermined threshold, T1, controlling circuitry (e.g. in drive temperature sensor 14) causes braking transistor 12 to transition to the ON state (step 23). In addition, at step 24 any cooling means arranged to cool components of the drive may be deactivated. When in the ON state, current is diverted to braking resistor 16. Braking resistor 16 is embedded in a heat sink and causes the temperature of drive to increase, by dissipating heat generated by the current flowing through braking resistor 16. This allows the temperature of the drive to move away from a critical point where the component may fail or malfunction.

If at step 25 a temperature of the critical component is determined to rise above a predetermined threshold, T2, controlling circuitry may cause cooling means to activate. This may form part of the usual thermal management function of the drive, and may be operated in conjunction with the temperature control described herein, e.g. via activation of braking resistor 16 as a function of monitored temperature. In addition, during deceleration of the motor, braking transistor 12 may be activated to energise braking resistor 16, as known in the art.

Thus, with the present invention the drive may operate more efficiently in cold environments. In particular, no additional components or sensors are required as drive temperature sensor 14 may already form part of the drive and may already be used to monitor a temperature of one or more components of the drive. The controlling means or controlling circuitry of the drive may therefore be simply reprogrammed to activate the braking resistor, not only when braking is required, but in particular when a temperature of the drive drops too low.

Whilst the invention has been described in connection with various embodiments, it is to be understood that the invention is not limited to these embodiments, and that alterations, modifications, and variations of these embodiments may be carried out by the skilled person without departing from the scope of the invention. For example, in the above embodiment circuit 10 is illustrated as being implemented in the drive, for example as software arranged to be executed using controlling circuitry of the drive.

However, in other embodiments it is envisaged that the controlling means may not form part of the drive and instead may be arranged to remotely activate the switching means.

The invention claimed is:

1. A motor drive comprising:
    a temperature sensor;
    a braking resistor;
    a plurality of components each having a critical temperature at which the component fails or malfunctions; the temperature sensor arranged to sense a temperature of a component of the plurality of components that is most sensitive to low temperatures
    switching means arranged when activated to cause current to flow to the braking resistor; and
    controlling means arranged to activate the switching means when the sensed temperature of the component that is most sensitive to low temperatures falls below a first predetermined threshold, to activate cooling means to cool the motor drive when the sensed temperature of the component that is most sensitive to low temperatures rises above a second predetermined threshold, and to deactivate said cooling means when the sensed temperature falls below the first predetermined threshold.

2. The motor drive of claim 1, wherein the component is one of: a braking transistor, a DC bus, an inverter, a power stage, a rectifier, a control stage, and a heat sink.

3. The motor drive of claim 1, wherein the braking resistor includes a strip heater.

4. The motor drive of claim 1, wherein the braking resistor includes embedded in a heat sink.

5. The motor drive of claim 1, wherein the switching means includes a braking transistor.

6. The motor drive of claim 1, wherein the cooling means includes a fan.

7. A method of controlling a temperature of a motor drive comprising a braking resistor and a plurality of components each having a critical temperature at which the component fails or malfunctions, the method comprising:
    monitoring a temperature of a component of the plurality of components being most sensitive to low temperatures;
    activating switching means to cause current to flow to the braking resistor when the monitored temperature of the component that is most sensitive to low temperatures falls below a first predetermined threshold;
    activating cooling means to cool the motor drive when the monitored temperature of the component that is most sensitive to low temperatures rises above a second predetermined threshold; and
    deactivating said cooling means when the monitored temperature falls below the first predetermined threshold.

8. The method of claim 7, wherein the component is one of: a braking transistor, a DC bus, an inverter, a power stage, a rectifier, a control stage, and a heat sink.

9. The method of claim 7, wherein the braking resistor includes a strip heater.

10. The method of claim 7, wherein the braking resistor includes embedded in a heat sink.

11. The method of claim 7, wherein the switching means includes a braking transistor.

12. A machine-readable medium having instructions stored thereon, wherein when read by a machine the instructions are configured to execute the steps of claim 7.

13. The method of claim 7, wherein the cooling means includes a fan.

* * * * *